United States Patent
Marti et al.

(10) Patent No.: US 11,657,814 B2
(45) Date of Patent: May 23, 2023

(54) TECHNIQUES FOR DYNAMIC AUDITORY PHRASE COMPLETION

(71) Applicant: HARMAN INTERNATIONAL INDUSTRIES, INCORPORATED, Stamford, CT (US)

(72) Inventors: Stefan Marti, Oakland, CA (US); Joseph Verbeke, San Francisco, CA (US); Evgeny Burmistrov, Saratoga, CA (US); Priya Seshadri, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 45 days.

(21) Appl. No.: 17/066,433

(22) Filed: Oct. 8, 2020

(65) Prior Publication Data

US 2022/0115010 A1    Apr. 14, 2022

(51) Int. Cl.
*G06F 21/32* (2013.01)
*G10L 15/22* (2006.01)
*G10L 15/18* (2013.01)
*G10L 15/183* (2013.01)
*G10L 15/02* (2006.01)

(52) U.S. Cl.
CPC .............. *G10L 15/22* (2013.01); *G10L 15/02* (2013.01); *G10L 15/183* (2013.01); *G10L 15/1822* (2013.01)

(58) Field of Classification Search
None
See application file for complete search history.

(56) References Cited

U.S. PATENT DOCUMENTS

| | | | | |
|---|---|---|---|---|
| 6,377,965 B1* | 4/2002 | Hachamovitch | ...... | G06F 40/274 715/203 |
| 8,843,375 B1* | 9/2014 | Ubillos | .................... | G10L 21/10 704/278 |
| 9,536,528 B2* | 1/2017 | Rubin | ...................... | G10L 25/51 |
| 9,672,454 B2* | 6/2017 | Suzuki | .............. | G06K 15/1809 |
| 11,237,696 B2* | 2/2022 | Carbune | ............. | G06F 3/04817 |
| 11,276,395 B1* | 3/2022 | Jones | ....................... | G10L 15/22 |
| 2006/0206454 A1* | 9/2006 | Forstall | ................. | G06F 16/951 |
| 2007/0073540 A1* | 3/2007 | Hirakawa | ............... | G10L 15/22 704/E15.04 |
| 2007/0185702 A1* | 8/2007 | Harney | ................. | G06F 40/205 704/4 |
| 2011/0066634 A1* | 3/2011 | Phillips | ................... | G10L 15/22 707/769 |
| 2011/0301955 A1* | 12/2011 | Byrne | ..................... | G06F 3/167 704/E15.005 |
| 2013/0156198 A1* | 6/2013 | Kim | ........................ | H04S 7/303 381/17 |
| 2014/0249817 A1* | 9/2014 | Hart | ....................... | G06F 3/167 704/254 |

(Continued)

*Primary Examiner* — Jakieda R Jackson
(74) *Attorney, Agent, or Firm* — Artegis Law Group, LLP

(57) ABSTRACT

Embodiments of the present disclosure set forth a computer-implemented method comprising detecting an initial phrase portion included in a first auditory signal generated by a user, identifying, based on the initial phrase portion, a supplemental phrase portion that complements the initial phrase portion to form a complete phrase, and providing a command signal that drives an output device to generate an audio output corresponding to the supplemental phrase portion.

13 Claims, 4 Drawing Sheets

(56) References Cited

U.S. PATENT DOCUMENTS

| | | | |
|---|---|---|---|
| 2014/0280551 A1* | 9/2014 | Byrd Vallieres de St. Real | H04L 67/12 709/204 |
| 2015/0006176 A1* | 1/2015 | Pogue | G10L 15/22 704/249 |
| 2016/0180852 A1* | 6/2016 | Huang | G10L 17/00 704/246 |
| 2016/0322045 A1* | 11/2016 | Hatfield | G10L 15/22 |
| 2017/0078238 A1* | 3/2017 | Huang | G01M 99/00 |
| 2018/0293974 A1* | 10/2018 | Georges | G10L 15/183 |
| 2018/0349494 A1* | 12/2018 | Zhao | G06F 16/634 |
| 2019/0043492 A1* | 2/2019 | Lang | H04N 21/42203 |
| 2019/0102145 A1* | 4/2019 | Wilberding | G06F 3/167 |
| 2019/0205325 A1* | 7/2019 | Dobrynin | G06F 16/3344 |
| 2019/0206406 A1* | 7/2019 | Sugiyama | B25J 11/0005 |
| 2019/0220246 A1* | 7/2019 | Orr | G06F 40/169 |
| 2020/0035212 A1* | 1/2020 | Yamabe | G10L 21/0224 |
| 2020/0045382 A1* | 2/2020 | Montgomery | H04N 21/8455 |
| 2020/0150780 A1* | 5/2020 | Wu | G06F 3/018 |
| 2020/0279566 A1* | 9/2020 | Washizaki | G06F 3/167 |
| 2020/0315138 A1* | 10/2020 | Mundell | A01K 15/021 |
| 2020/0349925 A1* | 11/2020 | Shahid | G10L 17/24 |
| 2021/0035422 A1* | 2/2021 | Sherman | H04R 3/005 |
| 2021/0043185 A1* | 2/2021 | Ziv | G10L 13/02 |
| 2021/0056970 A1* | 2/2021 | Jain | G10L 15/1822 |
| 2021/0193128 A1* | 6/2021 | Kim | G10L 15/22 |
| 2021/0193139 A1* | 6/2021 | Kim | G10L 15/19 |
| 2021/0201932 A1* | 7/2021 | Aravamudan | G10L 25/54 |
| 2021/0249006 A1* | 8/2021 | Bromand | G10L 21/0272 |
| 2021/0389868 A1* | 12/2021 | Crowder | A63F 13/63 |
| 2022/0038581 A1* | 2/2022 | Shih | H04L 65/403 |

\* cited by examiner

Phrase Completion Table — 200

| Stored Initial Phrase Portion | Supplemental Phrase Portion |
|---|---|
| 212 — "I am the main tester on the Phoenix project." | 250 — "I conduct testing on the prototypes in real-world environments." |
| 214 — "Pupillometry is *generally defined as...*" | 252 — External data source (lookup): [Pupillometry is] "the measurement of the pupil size of a person." |
| 216 — "Today we're going to discuss immersive interfaces..." | 254 — "which covers our efforts in virtual reality and augmented reality as it pertains to collaborative user interfaces in varying environments, including vehicle, workplace, and home environments." |
| 218 — "The *directions* to the conference room are..." | 256 — "Follow the arrows to the third door on the left." |

*Row markers: 210 (header). Numbers 258 also indicated.*

FIGURE 2

TECHNIQUES FOR DYNAMIC AUDITORY PHRASE COMPLETION

BACKGROUND

Field of the Various Embodiments

Embodiments disclosed herein relate to digital assistants and, in particular, to techniques for dynamic auditory phrase completion.

Description of the Related Art

In many settings, a speaker may repeat phrases to multiple listeners. For example, a salesperson may introduce herself, explain features of a product, and provide pricing information to multitudes of potential customers throughout a day or work week. Oftentimes, repeating the same speech multiple times to different audiences strains the speaker physically and mentally. For example, a speaker at a convention may repeat certain dialogue hundreds of times a day, straining the vocal cords of the speaker. In addition, the speaker must focus to ensure that she provides accurate information each time she repeats information to a listener, which occupies the mental load of the speaker and causes the speaker to fatigue.

In prior art audio delivery systems, a user may record her speech and replay the speech for various listeners to avoid repetition and strain on the user. One drawback of these systems is that such pre-recorded audio cannot adapt to individual conversations and settings. Such audio delivery systems are thus deemed as impersonal or non-responsive to the interests of the listener and are ineffective in sustaining the attention of the listener.

In light of the above, more effective techniques for delivering information to a listener through an audio delivery system.

SUMMARY

Embodiments of the present disclosure set forth a computer-implemented method comprising detecting an initial phrase portion included in a first auditory signal generated by a user, identifying, based on the initial phrase portion, a supplemental phrase portion that complements the initial phrase portion to form a complete phrase, and providing a command signal that drives an output device to generate an audio output corresponding to the supplemental phrase portion.

Further embodiments provide, among other things, non-transitory computer-readable storage media storing instructions for implementing the method set forth above, as well as a system configured to implement the method set forth above.

At least one technological advantage of the disclosed approach relative to the prior art is that by processing the dialogue of a user and completing phrases on behalf of a user in real time, the phrase processing system can complete individual phrases for a user, thus relieving physical and mental strains placed on a user when speaking repeated phrases. Further, by storing personalized phrases that a user repeats, the phrase a processing system can offer a broader range of phrases to assist the user, while also enabling the system to easily adapt to individual conversations. Further, the phrase processing system enables the user to tailor dialogue that is presented to different listeners, thus providing more natural-sounding audio delivery to listeners. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 illustrates an example phrase completion table included in the phrase processing system of FIG. 1, according to one or more embodiments;

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Overview

Embodiments disclosed herein include a phrase processing system that includes a phrase processing application that continually analyzes portions of speech made by a user and provides an audio output that completes phrases on behalf of the user. A processing unit included in the phrase processing system operates to receive an input speech signal corresponding to a portion of a phrase spoken by a user. The processing unit identifies an initial phrase portion and analyzes the actions performed by a user or a condition of a user in order to determine whether the user triggered the phrase processing application to complete the phrase. The processing unit searches internal or external data sources and uses information from the data sources to generate a supplemental phrase portion that complements the initial phrase portion. The processing unit drives an output device to emit soundwaves corresponding to the supplemental phrase portion.

The phrase processing system may be implemented in various forms of audiovisual-based systems, such as wearable audio devices, earpieces, mobile devices, personal computers, personal speaker systems, and so forth. The phrase processing system may perform its processing functions using a dedicated processing device and/or a separate computing device, such as a mobile computing device of a user or a cloud computing system. The phrase processing system may detect speech from a user using any number of auditory sensors, which may be attached to or integrated with other system components or disposed separately. The phrase processing system also acquires physiological data associated with the user using any type of sensor.

System Overview

Figure 1:
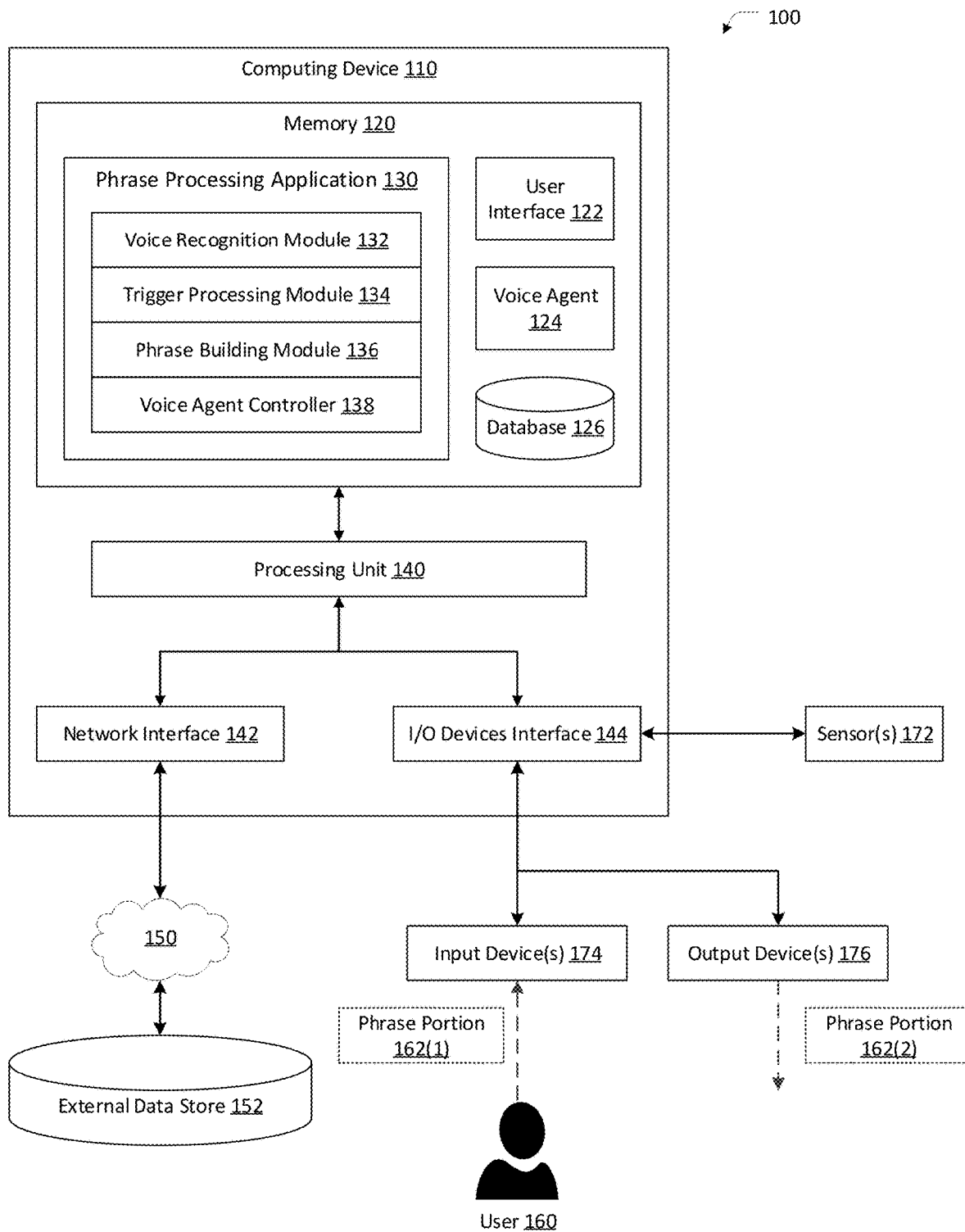
FIG. 1 illustrates a phrase processing system according to one or more embodiments.

FIG. 1 illustrates a phrase processing system according to one or more embodiments. As shown, phrase processing system 100 includes computing device 110, network 150, external data store 152, sensor(s) 172, input device(s) 174, and output device(s) 176. Computing device 110 includes memory 120, processing unit 140, network interface 142, and input/output devices interface 144. Memory 120 includes user interface 122, voice agent 124, database 126, and phrase processing application 130. Phrase processing application 130 includes voice recognition module 132, trigger processing module 134, phrase building module 136, and voice agent controller 138.

Computing device 110 includes processing unit 140 and memory 120. In various embodiments, computing device 110 may be a device that includes one or more processing units 140, such as a system-on-a-chip (SoC). In some embodiments, computing device 110 may be a wearable device, such as hearing aids, headphones, portable speakers, and/or other devices that include processing unit 140. In other embodiments, computing device 110 may be a computing device, such as a tablet computer, desktop computer, mobile phone, media player, and so forth. In some embodiments, computing device 110 may be a head unit included in a vehicle system or at-home entertainment system. Generally, computing device 110 can be configured to coordinate the overall operation of phrase processing system 100. The embodiments disclosed herein contemplate any technically-feasible system 100 configured to implement the functionality of phrase processing system 100 via computing device 110.

In various embodiments, one or more of computing device 110, sensor(s) 172, input device(s) 174, and/or output device(s) 176 may be included in one or more devices, such as mobile devices (e.g., cellphones, tablets, laptops, etc.), wearable devices (e.g., watches, rings, bracelets, headphones, etc.), consumer products (e.g., portable speakers, gaming, gambling, etc. products), smart home devices (e.g., smart lighting systems, security systems, digital assistants, etc.), communications systems (e.g., conference call systems, video conferencing systems, speaker amplification systems, etc.), and so forth. Computing device 110 may be located in various environments including, without limitation, building environments (e.g., living room, conference room, conference hall, home office, etc.), road vehicle environments (e.g., consumer car, commercial truck, etc.), aerospace and/or aeronautical environments (e.g., airplanes, helicopters, spaceships, etc.), nautical and submarine environments, outdoor environments, and so forth.

For example, a wearable device could include at least one microphone as input device 174, at least one speaker as output device 176, and a microprocessor-based digital signal processor (DSP) as processing unit 140 that produces auditory signals that drive the at least one speaker to emit soundwaves. In some embodiments, phrase processing system 100 may be included in a digital voice assistant that includes one or more microphones, one or more loudspeakers, and one or more processing units. In some embodiments, various components of phrase processing system 100 may be contained within, or implemented by, different kinds of wearable devices and/or non-wearable devices. For example, one or more of computing device 110, sensor(s) 172, input device(s) 174, and/or output device(s) 176 could be disposed within a hat, scarf, shirt collar, jacket, hood, etc. Similarly, processing unit 140 could provide user interface 122 via input device(s) 174 and/or output device(s) 176 that are included in a separate mobile or wearable device, such as a smartphone, tablet, wristwatch, arm band, etc. The separate mobile or wearable device could include an associated microprocessor and/or a digital signal processor that could also be used to provide additional processing power to augment the capabilities of the computing device 110.

Processing unit 140 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. Processing unit 140 generally comprises a programmable processor that executes program instructions to manipulate input data. In some embodiments, processing unit 140 may include any number of processing cores, memories, and other modules for facilitating program execution. For example, processing unit 140 could receive an input (e.g., phrase portion 162) from user 160 via input device(s) 174 and/or sensor data via sensor(s) 172 and drive output device(s) 176 to provide phrase portion 162(2), where phrase portion 162(2) complements phrase portion 162(1) to form a complete phrase.

In some embodiments, processing unit 140 can be configured to execute phrase processing application 130 in order to analyze input auditory signals from input device(s) 174 and/or acquired sensor data from sensor(s) 172 and generate at least an auditory output. In such instances, phrase processing application 130 may generate an output auditory signal that acts as a supplement to the input auditory signal. For example, user 160 could speak a first portion (e.g., phrase portion 162(1)) of a phrase that computing device 110 receives via input device 174. Processing unit 140 may execute phrase processing application 130 and voice agent 124 to provide phrase portion 162(2) via output device(s) 176.

In some embodiments, processing unit 140 could execute phrase processing application 130 to initially determine whether user 160 triggered phrase processing application 130 to provide phrase portion 162(2). In such instances, processing unit 140 may execute phrase processing application 130 to provide phrase portion 162(2) upon identifying a triggering event associated with user 160.

Memory 120 includes a memory module, or collection of memory modules. Memory 120 may include a variety of computer-readable media selected for their size, relative performance, or other capabilities: volatile and/or non-volatile media, removable and/or non-removable media, etc. Memory 120 may include cache, random access memory (RAM), storage, etc. Memory 120 may include one or more discrete memory modules, such as dynamic RAM (DRAM) dual inline memory modules (DIMMs). Of course, various memory chips, bandwidths, and form factors may alternately be selected.

Non-volatile memory included in memory 120 generally stores application programs including phrase processing application 130, and data (e.g., data stored in database 126) for processing by processing unit 140. In various embodiments, memory 120 may include non-volatile memory, such as optical drives, magnetic drives, flash drives, or other storage. In some embodiments, separate data stores, such as external data store 152 included in network 150 ("cloud storage") may supplement memory 120. Phrase processing application 130 within memory 120 can be executed by processing unit 140 to implement the overall functionality of computing device 110 and, thus, to coordinate the operation of transparent sound management system 100 as a whole.

In various embodiments, memory 120 may include one or more modules for performing various functions or techniques described herein. In some embodiments, one or more of the modules and/or applications included in memory 120 may be implemented locally on computing device 110, and/or may be implemented via a cloud-based architecture. For example, any of the modules and/or applications included in memory 120 could be executed on a remote device (e.g., smartphone, a server system, a cloud computing platform, etc.) that communicates with computing device 110 via network interface 142 or I/O devices interface 144.

In various embodiments, phrase processing application (PPA) 130 may implement one or more modules 132-138 to process phrase portion 162(1) via input device(s) 174 and/or sensor data via sensor(s) 172 in order to determine whether user 160 intends for phrase processing application 130 to complete a given phrase and complete the given phrase on behalf of user 160. In such instances, phrase processing application 130 causes voice agent 124 to drive output device(s) 176 to emit soundwaves corresponding to phrase portion 162(2). For example, user 160 could speak a phrase portion 162(1) that corresponds to an initial section of a given phrase, and phrase processing application 130 could respond by generating phrase portion 162(2) that corresponds to the remaining, supplemental portion of the given phrase.

Voice recognition module 132 performs various natural language processing (NLP) techniques, sentiment analysis, and/or speech analysis in order to identify phrases spoken by user 160. In various embodiments, voice recognition module 132 determines a semantic meaning of speech made by user 160 in order to determine whether the provided speech is a portion of a phrase. In some embodiments, voice recognition module 132 performs sentiment analysis to determine an intended meaning of a phrase and/or determine whether the speaker has made an aberration in a repeated phrase.

In some embodiments, voice recognition module 132 could employ various statistical methods, machine-learning (ML) methods, state machines, and/or various other data structures in order to identify aberrations and/or deviations of phrases spoken by user 160. Additionally or alternatively, user 160 may train the ML models by providing feedback to certain identified words or speech portions. In some embodiments, a combination of training data (e.g., previous phrases, physiological metrics, etc.) may train the ML models.

Trigger processing module 134 determines whether a triggering event occurred that indicates that phrase processing application 130 is to provide phrase portion 162(2). In some embodiments, trigger processing module 134 may identify a specific action taken by user 160. For example, user 160 could speak a specific trigger word or trigger phrase, or could take a pause from speaking. In another example, user 160 could press a button or make a specific gesture. In such instances, trigger processing module 134 may analyze data acquired via input device(s) 174 (e.g., auditory signals acquired via microphones) or sensor(s) 172 (e.g., image data) in order to identify a triggering event.

In some embodiments, trigger processing module 134 may identify a condition corresponding to a triggering event. For example, trigger processing module 134 may receive an alert from voice recognition module 132 that identifies an aberration in the speech of user 160. Trigger processing module 134 could respond to the identified aberration as a triggering condition to help user 160 in completing a given phrase and/or subsequent phrases made by user 160.

Phrase building module 136 generates a phrase portion 162(2) that complements an input phrase portion 162(1). In various embodiments, phrase portions 162(1), 162(2) may combine to form a complete phrase. In some embodiments, phrase building module 136 responds to a triggering event identified by trigger processing module 134 by analyzing phrase portion 162(1) in order to identify phrase portion 162(2).

In some embodiments, phrase building module 136 may refer to one or more external data sources that maintain one or more external data stores 152. For example, user 160 could initially set a preferred knowledge base or search engine for phrase processing application 130 to query. Phrase building module 136 could use one or more words included in phrase portion 162(1) as search terms to identify an applicable statement or data source. For example, phrase building module 136 could send a query to an online encyclopedia knowledge base that includes external data store 152 in order to retrieve a definition for a certain term. Phrase building module 136 could then generate phrase portion 162(2) to include a text string and/or audio clip based on the information provided by external data store 152.

In some embodiments, phrase building module 136 may scan one or more data sources included in local database 126. For example, computing device 110 could maintain a phrase completion table in memory 120 that maintains a personalized list of complete phrases (stored as either complete phrases, or mappings between phrase portions) that are associated with user 160. In some embodiments, phrase building module 136 may initially search a phrase completion table for personalized information about a given word or phrase before searching external knowledge bases at external data stores 152.

Voice agent controller 138 generates an output that causes voice agent 124 to provide phrase portion 162(2) as an audio output via output device(s) 176. In various embodiments, voice agent controller 138 may provide an audio clip for voice agent 124 to reproduce. For example, phrase processing application 130 could store a phrase spoken by user 160 as an audio clip in database 126. When phrase building generates a phrase portion 162(2), voice agent controller 138 could retrieve the applicable audio clip 364 from database 126 and provide at least a portion of audio clip 364 to voice agent 124 to produce via output device 176. In various embodiments, voice agent controller 138 may cause voice agent 124 to synthesize phrase portion 162(2). For example, voice agent controller 138 could generate commands for voice agent 124 perform text-to-speech techniques to provide audio corresponding to a text string. In some embodiments, voice agent controller 138 may synthesize phrase portion 162(2) using a synthesized voice that sounds similar to the voice of user 160.

User interface 122 enables user 160 to provide input(s) about specific data, such as input phrases, preferred external data store(s) 152, audio clips to store, voices that voice agent 124 is to use, and so forth. In some embodiments, user interface 122 may take any feasible form for providing the functions described herein, such as one or more buttons, toggles, sliders, dials, knobs, etc., or as a graphical user interface (GUI).

In various embodiments, user interface 122 may be provided through any component of phrase processing system 100. In one embodiment, user interface 122 may be provided by a separate computing device that is communicatively coupled with computing device 110, such as through an application running on a user's mobile or wearable computing device. In another example, user interface 122 may receive verbal commands for user selections. In this case, computing device 110 may perform speech recognition on the received verbal commands and/or compare the verbal commands against commands stored in memory 120. After verifying the received verbal commands, computing device 110 could then execute the commanded function for phrase processing system 100 (e.g., storing a specific phrase and/or audio clip).

Voice agent 124 synthesizes one or more phrases that are to be generated as an auditory signal. For example, voice agent 124 could synthesize a phrase that is included in a command signal from voice agent controller 138 signal. Voice agent 124 could then generate an output signal to drive one or more loudspeakers included in output device 176 to emit soundwaves corresponding to the synthesized phrase.

Database (DB) 126 may store values and other data retrieved by processing unit 140 to coordinate the operation of phrase processing system 100. In various embodiments, in operation, processing unit 140 may be configured to store values in database 126 and/or retrieve values stored in database 126. For example, database 126 could store sensor data, audio content (e.g., audio clips, previous speech portions, etc.), a phrase completion database, and/or one or more data stores that act as a source of truth. For example, database 126 may download a knowledge base that corresponds to an external data store (e.g., a downloadable portion of map data, a portion of Wikipedia®, etc.). In such instances, one or more modules may refer to internal information stored in database 126 in lieu of communication with external data store 152.

In some embodiments, computing device 110 may communicate with other devices, such as sensor(s) 172, input device(s) 174, and/or output device(s) 176, using input/output (I/O) devices interface 144. In such instances, I/O devices interface 144 may include any number of different I/O adapters or interfaces used to provide the functions described herein. For example, I/O devices interface 144 could include wired and/or wireless connections, and may use various formats or protocols. In another example, computing device 110, through I/O devices interface 144, could receive auditory signals from input device(s) 174, may detect physiological data, visual data, and so forth using sensor(s) 172, and may provide output signals to output device(s) 176 to produce outputs in various types (e.g., visual indication, soundwaves, haptic sensations, etc.).

In some embodiments, computing device 110 may communicate with other devices, such as external data store 152, using network interface 142 and network 150. In some embodiments, other types of networked computing devices (not shown) may connect to computing device 110 via network interface 142. Examples of networked computing devices include a server, a desktop computer, a mobile computing device, such as a smartphone or tablet computer, and/or a worn device, such as a wristwatch or headphones or a head-mounted display device. In some embodiments, the networked computing devices may be used as sensor(s) 172, input device(s) 174, and/or output device(s) 176.

Network 150 includes a plurality of network communications systems, such as routers and switches, configured to facilitate data communication between computing device 110 and external data store 152. Persons skilled in the art will recognize that many technically-feasible techniques exist for building network 150, including technologies practiced in deploying an Internet communications network. For example, network 150 may include a wide-area network (WAN), a local-area network (LAN), and/or a wireless (Wi-Fi) network, among others.

External data store(s) 152 include various libraries that provide various types of information. For example, external data stores 152 may include backends for search engines, dictionaries, online encyclopedias, mapping data, fact-checking websites, news websites, and so forth. In various embodiments, phrase processing application 130 may search multiple external data stores 152 and use information provided by one or more external data store(s) 152 to identify a complete phrase and/or identify a phrase portion corresponding to phrase portion 162(1).

Sensor(s) 172 include one or more devices that collect data associated with objects in an environment. In various embodiments, sensor(s) 172 may include groups of sensors that acquire different sensor data. For example, sensor(s) 172 could include a reference sensor, such as a microphone and/or a visual sensor (e.g., camera, thermal imager, linear position sensor, etc.), which could acquire auditory data, visual data, physiological data, and so forth.

In various embodiments, sensor(s) 172 and/or input device(s) 174 may include audio sensors, such as a microphone and/or a microphone array that acquires sound data. In various embodiments, the microphone may be directional (e.g., user-facing microphone, beamforming microphone array, etc.) and acquire auditory data from a specific person, such as user 160. Such sound data may be processed by phrase processing application 130 using various audio processing techniques. The audio sensors may be a plurality of microphones or other transducers or sensors capable of converting sound waves into an electrical signal. The audio sensors may include an array of sensors that includes sensors of a single type, or a variety of different sensors. Sensor(s) 172 may be worn by a user, disposed separately at a fixed location, or movable. Sensor(s) 172 may be disposed in any feasible manner in the environment. In some embodiments, sensor(s) 172 may be oriented toward user 160 relative to output device(s) 176, which may be generally disposed outward, while sensor(s) 172 are also user-oriented Sensor(s) 172 may include one or more devices that perform measurements and/or acquire data related to certain subjects in an environment. In various embodiments, sensor(s) 172 may generate sensor data that is related to user 160. For example, sensor(s) 172 could collect biometric data related to user 160 (e.g., visible perspiration, muscle movement, breathing rate, pupil size, eye saccades, temporary change in skin color, etc.). and/or user 160 when speaking (e.g., heart rate, brain activity, skin conductance, blood oxygenation, galvanic skin response, blood-pressure level, average blood glucose concentration, etc.). Further, sensor(s) 172 could include a user-facing camera that records the face of user 160 as image data. Similarly, sensor(s) 172 could include a facial electromyography (fEMG) sensor that measures specific muscle contractions and associated activities (e.g., a raised eyebrow, clenched jaw, etc.), of user 160. Phrase processing application 130 could then analyze the image data in order to determine the facial expression of user 160.

In another example, sensor(s) 172 could include sensors that acquire biological and/or physiological signals of user 160 when speaking (e.g., perspiration, heart rate, heart-rate variability (HRV), blood flow, blood-oxygen levels, breathing rate, galvanic skin response (GSR), sounds created by a user, behaviors of a user, etc.). Additionally, sensor(s) 172 could include a pupil sensor (e.g., a camera focused on the eyes of user 160) that acquires image data about at least one pupil of user 160. Phrase processing application 130 could then perform various pupillometry techniques to detect eye parameters (e.g., fluctuations in the pupil diameter, eye gaze direction, eye lid position, eye saccades, etc.) as physiological data.

Input device(s) 174 are devices capable of receiving one or more inputs. In various embodiments, input device(s) 174 may include one or more audio input devices, such as a microphone, a set of microphones, and/or a microphone array. Additionally or alternatively, input device(s) 174 may include other devices capable of receiving input, such as a keyboard, a mouse, a touch-sensitive screen, and/or other input devices for providing input data to computing device 110. For example, input from user 160 may include gestures, such as various movements or orientations of the hands, arms, eyes, or other parts of the body that are received via a camera. In various embodiments, user 160 may trigger phrase processing application 130 to complete a phrase in lieu of phrase processing application 130 automatically attempting to provide phrase portion 162(2).

Output device(s) 176 include devices capable of providing output, such as a display screen, loudspeakers, haptic output devices, and the like. For example, output device 176 could be headphones, ear buds, a speaker system (e.g., one or more loudspeakers, amplifier, etc.), or any other device that generates an acoustic field. In another example, output device 176 could include haptic output devices, such as ultrasound transducers, air vortex generators, air bladders, and/or any type of device configured to generate haptic output. In various embodiments, various input device(s) 174 and/or output device(s) 176 can be incorporated into computing device 110, or may be external to computing device 110.

In various embodiments, output device(s) 176 may be implemented using any number of different conventional form factors, such as discrete loudspeaker devices, around-the-ear (circumaural), on-ear (supraaural), or in-ear headphones, hearing aids, wired or wireless headsets and/or personal speakers, body-worn (head, shoulder, arm, etc.) speaker devices, body-worn close-range directional speakers or speaker arrays, body-worn ultrasonic speaker arrays, and so forth. In some embodiments, output device(s) 176 include other forms of outputs, such as display devices that provide visual outputs. In some embodiments, output device(s) 176 may be worn by user 160, or disposed separately at a fixed location, or movable. As discussed above, output device(s) 176 may be disposed inward of the sensor(s) 172 and oriented inward toward a particular region or user 160.

FIG. 2 illustrates an example phrase completion table included in the phrase processing system of FIG. 1, according to one or more embodiments. As shown, phrase completion table 200 includes column 210 for stored initial phrase portions and column 250 for supplemental phrase portions. Phrase completion table 200 includes a set of stored initial phrase portion entries 212-218 and supplemental phrase portion entries 252-258.

For a given entry (e.g., stored initial phrase portion 212 and supplemental phrase portion 252), phrase processing application 130 may store a phrase spoken by user 160. In some embodiments, phrase processing application 130 may store a phrase as a single entry. In other embodiments, phrase processing application 130 may store a mapping between a stored initial phrase portion 212 and a supplemental phrase portion 252.

For the first entry ("entry 1"), phrase processing application 130 may record user 160 speaking one or more phrase portions (which may include multiple sentences). In such instances, user 160 may perform an action that triggers phrase processing application 130 to store the phrase in phrase completion table 200. When user 160 subsequently speaks stored initial phrase portion 212, phrase processing application 130 may respond by retrieving a portion of the recorded speech, previously spoken by user 160, that corresponds to supplemental phrase portion 252.

For the second entry ("entry 2"), phrase processing application 130 may store initial phrase portion 214 that includes a trigger phrase ("generally defined as"). In some embodiments, phrase processing application 130 may refer to entry 2 when user 160 speaks a different trigger phrase (e.g., "can be defined as"). In such instances, phrase building module 136 may retrieve supplemental phrase portion 256 as corresponding to a stored initial phrase portion 214 that uses a different trigger phrase.

For the third entry ("entry 3"), phrase completion table 200 may store a complete phrase instead of as two distinct phrase portions 216, 256. In such instances, phrase building module 136 may generate supplemental phrase portion 256 by removing a portion of the complete phrase (corresponding to stored initial phrase portion 216) from the complete phrase.

For the fourth entry ("entry 4"), phrase completion table 200 may store initial phrase portion 218 that includes a trigger phrase for a specific data store 152. In such instances, phrase processing application 130 may refer to the specific external data store 152 for supplemental phrase portion 258. For example, upon identifying the trigger term ("directions"), phrase building module 136 could search a map repository. Phrase building module 136 may then update supplemental phrase portion 258 with information retrieved from the online library. In some embodiments, phrase building module 136 may update supplemental phrase portion 258 based on the current position of user 160.

Dynamic Auditory Phrase Completion

Figure 3:
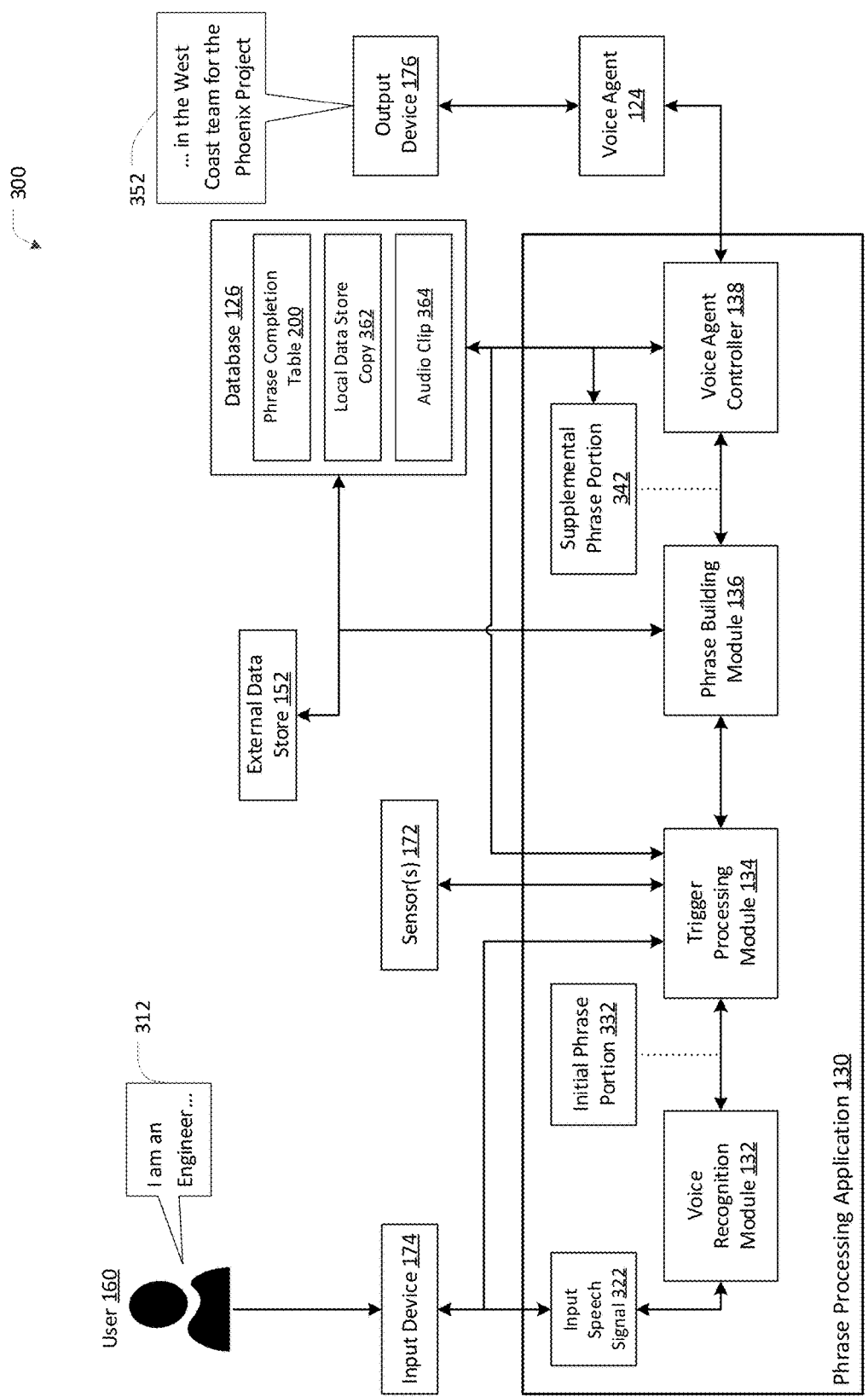
FIG. 3, illustrates a technique of the phrase processing system of FIG. 1 phrase processing and dynamic auditory phrase completion to a portion of speech made by a user, according to one or more embodiments.

FIG. 3 illustrates a technique of the phrase processing system 100 of FIG. 1 phrase processing and dynamic auditory phrase completion to a portion of speech made by a user, according to one or more embodiments. As shown, phrase processing system 300 includes input device 174, sensor(s) 172, database 126, external data store(s) 152, voice agent 124, output device 176, and phrase processing application 130. Phrase processing application 130 includes voice recognition module 132, trigger processing module 134, phrase building module 136, and voice agent controller 138. Database 126 includes phrase completion table 200, local data store copy 362, and audio clip 364

In operation, input device 174 receives a speech portion 312 made by user 160 and transmits speech portion 312 as input speech signal 322 to voice recognition module 132. Voice recognition module 132 parses and analyzes input speech signal 322 to identify any phrases included in input speech signal 322. Upon identifying a phrase, voice recognition module 132 generates initial phrase portion 332 and transmits initial phrase portion 332 to trigger processing module 134 and/or phrase building module 136.

In various embodiments, trigger processing module 134 determines whether user 160 performed an action indicating that phrase processing system 300 is to complete a phrase. In some embodiments, trigger processing module 134 may process speech input speech signal 322 and/or other acquired audio via input device 174. For example, input speech signal 322 could include a personalized key phrase or keyword that was previously stored in phrase completion table 200 (e.g., "my assistant will tell you about", etc.). In another example, input speech signal 322 could include a general trigger phrase (e.g., "defined", "it is commonly known", etc.). Trigger processing module 134 could respond to identifying the trigger phrase by determining that user 160 is triggering phrase processing system 300 to complete a phrase. In such instances, phrase processing application 130 could dynamically determine words and/or phrases said before or after the trigger phrase and perform searches for the identified keywords For example, when input speech signal 322 include "cognitive dissonance is defined as," phrase processing system 300 could respond to identifying "is defined as" by selecting "cognitive dissonance as a key phrase that is included in initial phrase portion 332. Trigger processing module 134 could then generate a command for phrase building module 136 to complete the phrase that includes initial phrase portion 332.

In some embodiments, trigger processing module 134 may process the acquired audio and identify a pause and/or aberration in the speech of user 160. For example, trigger processing module 134 could identify a pause of over three seconds in a phrase that voice recognition module 132 identifies as a partial phrase. Trigger processing module 134 could respond by identifying the pause as a trigger. In another example, voice recognition module 132 could identify an aberration in phrases spoken by user 160, where the aberration could indicate fatigue by the user (e.g., softer speech indicating hoarseness, slurred speech, stilted speech indicating metal fatigue, etc.). Trigger processing module 134 could respond to the identified aberration as a triggering condition to help user 160 in completing a given phrase and/or subsequent phrases made by user 160.

In some embodiments, trigger processing module 134 may receive a trigger signal directly from input device 174. For example, input device 174 could be an actuator or other manually-triggered mechanism, such as a button, key fob, finger ring, etc. that transmits a trigger signal in response to a manual input from user 160. In such instances, trigger processing module 134 could identify a triggering event upon receiving the trigger signal from input device 174.

Additionally or alternatively, trigger processing module 134 may receive other sensor data from sensor(s) 172. In some embodiments, sensor 172 could include a user-face camera and/or facial electromyography (fEMG) sensor that acquires sensor data associated with gestures and/or facial expressions of user 160. In such instances, trigger processing module 134 could compare biometric values associated with the sensor data to one or more threshold values to identify a triggering event. For example, an fEMG sensor included in sensor 172 could provide biometric data indicating that user 160 clenched her jaw. Trigger processing module 134 identifies a triggering event upon determining that the clenched jaw exceeded a threshold value. In another example, trigger processing module 134 could identify a triggering event upon detecting, via image data or other biometric data, that user 160 raised at least one eyebrow. In some embodiments, trigger processing module 134 could identify a triggering event as a combination of multiple actions, such as a pause in the speech of user 160, along with user 160 blinking rapidly.

Phrase building module 136 responds to trigger processing module 134 identifying a triggering event by generating supplemental phrase portion 342. In various embodiments, initial phrase portion 332 and supplemental phrase portion 342 combine to form a complete phrase. In some embodiments, phrase building module 136 responds to trigger processing module 134 identifying a triggering event by analyzing initial phrase portion 332 and identifying supplemental phrase portion 342.

In some embodiments, phrase building module 136 may refer to one or more external data sources that maintain one or more external data stores 152. For example, user 160 could initially set a preferred knowledge base or search engine for phrase processing application 130 to query. Upon receiving initial phrase portion 332, phrase building module 136 could use one or more words included in initial phrase portion 332 as search terms to identify an applicable statement or data set (e.g., one or more text strings in a website) that is applicable to initial phrase portion 332. For example, phrase building module 136 could send a query to a dictionary knowledge base that includes external data store 152 in order to retrieve a definition for a certain term. Phrase building module 136 could then generate supplemental phrase portion 342 to include a text string and/or audio clip for the definition. In some embodiments, phrase building module 136 may store initial phrase portion 332 and the generated supplemental phrase portion 342 as an entry in phrase completion table 200.

In some embodiments, phrase building module 136 may scan one or more data sources included in local database 126. For example, phrase processing application 130 could download a portion of a knowledge base and search the downloaded local copy of the knowledge base (e.g., local data store copy 362) in order to speed searches and enable offline operability. In another example, phrase processing application 130 could maintain phrase completion table 200 that maintains a personalized list of complete phrases (stored as either complete phrases or mappings between initial phrase portion 332 and supplemental phrase portion 342) that are associated with user 160. In some embodiments, phrase building module 136 may initially search phrase completion table 200 before searching external knowledge bases at external data stores 152. Phrase building module 136 may use initial phrase portion 332 to identify an applicable entry in phrase completion table 200 and retrieve the supplemental phrase portion 342 from the applicable entry.

In some embodiments, phrase building module 136 may generate supplemental phrase portion 342 based on initial phrase portion 332. For example, phrase completion table 200 may store a complete phrase as an entry. Phrase building module 136 may generate supplemental phrase portion 342 by removing initial phrase portion from the complete phrase. For example, phrase completion table 200 may store an entry that includes the complete phrase, "I am an engineer in the West Coast team for the Phoenix Project." Phrase building module 136 could receive initial phrase portion 332 corresponding to speech portion 312 and remove initial phrase portion 332 from the complete phrase to generate supplemental phrase portion 342 ("in the West Coast team for the Phoenix Project.").

Phrase building module 136 transmits supplemental phrase portion 342 to voice agent controller 138. Voice agent controller 138 generates an output that causes voice agent 124 to provide supplemental phrase portion 352 as an audio output via output device 176. In various embodiments, voice agent controller 138 may provide an audio clip 364 for voice agent 124 to reproduce. For example, phrase processing application 130 could store a phrase spoken by user 160 as audio clip 364 in database 126 and associate audio clip 364 with a given phrase. When phrase building generates a supplemental phrase portion 342 that is associated with the given phrase, voice agent controller 138 may retrieve the applicable audio clip 364 from database 126 and provide at least a portion of audio clip 364 to voice agent 124 to produce via output device 176. In some embodiments, one or more audio clips 364 may be stored in network storage. In such instances, voice agent controller 138 may connect to external data store 152 to obtain the remotely-stored audio clip 364.

In various embodiments, voice agent controller 138 may cause voice agent to synthesize supplemental phrase portion 342. For example, voice agent controller 138 could generate commands for voice agent 124 perform text-to-speech techniques to provide an audio signal corresponding to a text string included in supplemental phrase portion 342. In some embodiments, voice agent controller 138 may synthesize supplemental phrase portion 342 using a synthesized voice similar to user 160. For example voice agent 124 could sample speech made by user 160 and generate a personalized voice corresponding to user 160. In such instances, voice agent 124 could respond to commands from voice agent controller 138 by synthesizing words in a manner (e.g., tone, speed, volume, etc.) that simulates user 160. In other embodiments, voice agent 124 may synthesize supplemental phrase portion 342 using a generic text-to-speech voice. In such instances, user 160 may select a specific voice from a set of generic voices. Additionally or alternatively, voice agent controller 138 may combine an audio clip 364 with a synthesized speech portion in order to provide a complete supplemental phrase portion 342.

Voice agent 124 provides output device 176 with an output signal that is based on supplemental phrase portion 342. For example, voice agent 124 could generate an audio output signal that drives one or more loudspeakers included in output device 176 to emit soundwaves corresponding to speech portion 352. In some embodiments, voice agent 124 may include one or more other output signals. For example, voice agent 124 may include one or more video output signals that drives a display device to display an image or video corresponding to speech portion 352 (e.g., illustrating a soundwave corresponding to the audio output signal, illustrating an avatar mouthing the words in speech portion 352, etc.).

In some embodiments, output device 176 may be directional and provide an output to a specific target. For example, output device 176 may include one or more directional speakers that generate a steerable beam. In such instances, output device 176 may form a beam towards a target listener such that the listener hears speech portion 352 in addition to the speech portion 312 that was spoken by user 160.

In various embodiments, phrase processing application 130 may continually process speech made by user 160. For example, phrase processing application 130 could identify initial phrase portion 332 from input speech signal 322 without receiving a trigger from user 160 to provide supplemental phrase portion. Phrase processing application 130 could then listen for a subsequent phrase made by user 160 and, upon identifying a triggering event, provide a supplemental phrase portion for that subsequent phrase.

Figure 4:
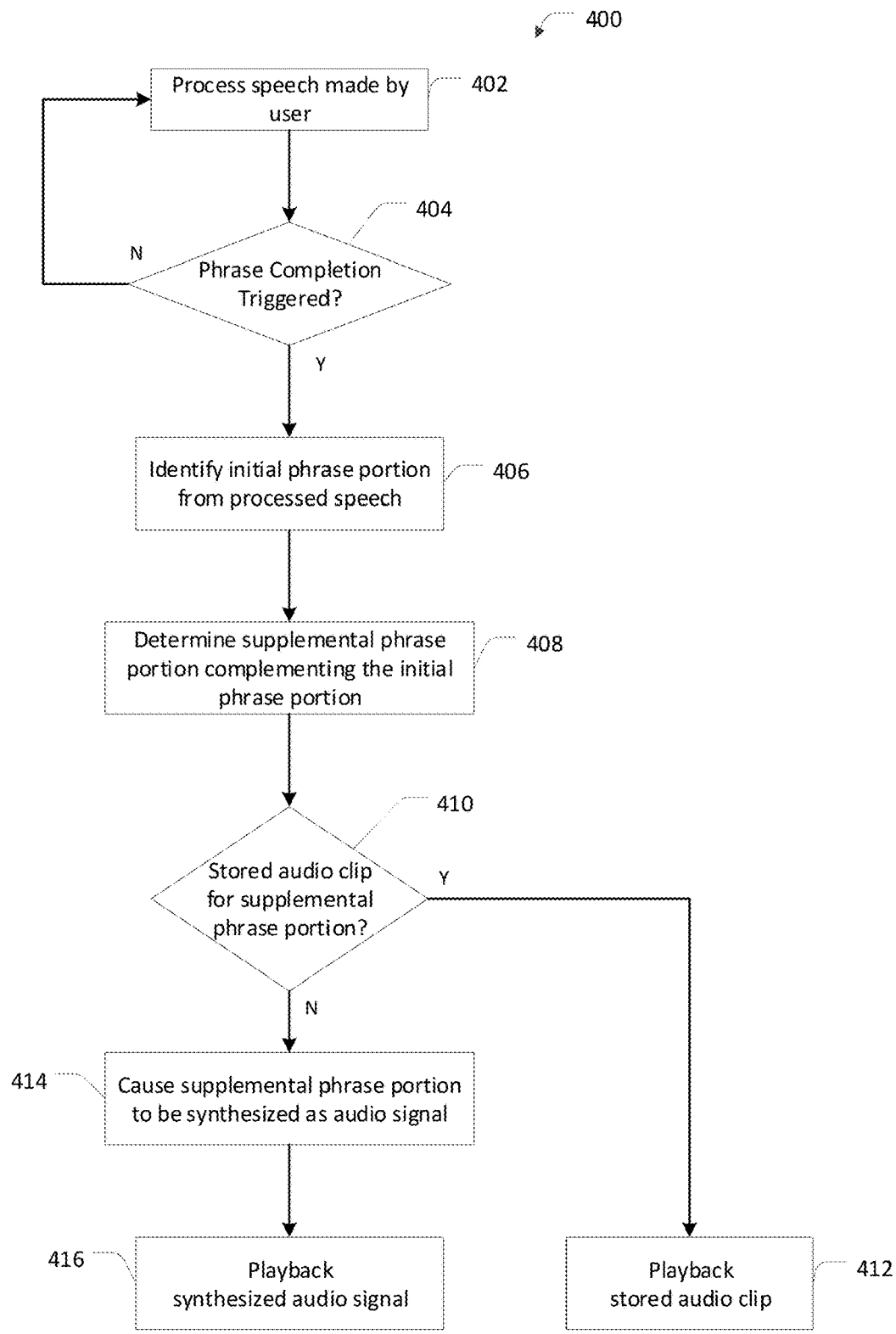
FIG. 4 is a flow diagram of methods steps to dynamically complete a phrase spoken by a user, according to one or more embodiments.

FIG. 4 is a flow diagram of methods steps to dynamically complete a phrase spoken by a user, according to one or more embodiments. Although the method steps are described with respect to the systems of FIGS. 1-3, persons skilled in the art will understand that any system configured to perform the method steps, in any order, falls within the scope of the various embodiments. In some embodiments, phrase processing system 100 may continually execute method 400 on captured audio in real-time.

Method 400 begins at step 402, where phrase processing application 130 processes speech made by user 160. In various embodiments, phrase processing application receives an input speech signal 322 from input device 174. Input speech signal 322 corresponds to a speech portion 312 that was spoken by user 160. In some embodiments, voice recognition module 132 included in phrase processing application 130 may perform various natural language processing techniques to identify words that are included in input speech signal 322.

At step 404, phrase processing application 130 determines whether a triggering event occurred, where the triggering event indicates that phrase processing application 130 is to complete a phrase. In various embodiments, trigger processing module 134 included in phrase processing application 130 determines whether user 160 has performed an action or is in a condition to trigger the phrase processing application 130 to complete a phrase corresponding to initial phrase portion 332. In some embodiments, trigger processing module 134 may analyze input speech signal 322 and/or initial phrase portion 332 in order to identify a component (e.g., a trigger phrase, pause, aberration, etc.) as a triggering event. Additionally or alternatively, trigger processing module may analyze sensor data, such as image and/or biometric data, to determine whether user 160 has performed a specific action (e.g., muscle contraction, eye gaze direction, hand movement, etc.) or is in a specific condition (e.g., received alert, biometric values beyond an acceptable range, etc.) that indicates that phrase processing application 130 is to complete a phrase on behalf of user 160.

Upon determining that a triggering event has occurred, phrase processing application 130 proceeds to step 406; otherwise, phrase processing application 130 determines that a triggering event has not occurred and returns to step 402 to process more speech that was spoken by user 160.

As step 406, phrase processing application 130 identifies an initial phrase portion from the processed speech. In various embodiments, voice recognition module 132 parses and analyzes input speech signal 322 to identify phrases included in input speech signal 322. Upon identifying a phrase, voice recognition module 132 may generate initial phrase portion 332 and transmits initial phrase portion 332 to trigger processing module 134 and/or phrase building module 136. In some embodiments, phrase processing application 130 may perform step 406 before step 404. In such instances, voice recognition module 132 may identify phrase portion 332 independent of trigger processing module 134 determining whether a triggering event occurred.

At step 408, phrase processing application 130 determines a supplemental phrase portion 342 that complements initial phrase portion 332. In various embodiments, phrase building module 136 included in phrase processing application 130 may refer to one or more data sources (e.g., internal database 126 and/or external data store 152) in order to generate a supplemental phrase portion 342 that complements initial phrase portion 332.

In some embodiments, database 126 may store a phrase completion table 200 that maintains a personalized list of complete phrases (stored as either complete phrases or mappings between initial phrase portion 332 and supplemental phrase portion 342) that are associated with user 160. In such instances, phrase building module 136 may use initial phrase portion 332 to identify an applicable entry in phrase completion table 200 and retrieve the supplemental phrase portion 342 from the applicable entry.

Additionally or alternatively, phrase building module 136 could use one or more words included in initial phrase portion 332 in a query to external data store 152 to identify an applicable data set (e.g., one or more text strings in a website) that is applicable to initial phrase portion 332. Phrase building module 136 could then generate supplemental phrase portion 342 to include information derived from the applicable data set. In some embodiments, phrase building module 136 may store initial phrase portion 332 and the generated supplemental phrase portion 342 as an entry in phrase completion table 200.

At step 410, phrase processing application 130 determines whether computing device 110 is storing an audio clip 364 corresponding to supplemental phrase portion 342. In various embodiments, voice agent controller 138 included in phrase processing application 130 may determine whether database 126 is storing an audio clip 364 that corresponds to supplemental phrase portion 342. For example, phrase processing application 130 could store a phrase spoken by user 160 as audio clip 364 in database 126 and associate audio clip 364 with a given phrase. When phrase building generates a supplemental phrase portion 342 that is associated with the given phrase, voice agent controller 138 may retrieve the applicable audio clip 364 from database 126. When voice agent controller 138 determines that database 126 includes a stored audio clip 364 for supplemental phrase portion 342, phrase processing application 130 proceeds to step 412; otherwise, voice agent controller 138 determines that database 126 has no stored audio clip corresponding to supplemental phrase portion 342 and proceeds to step 414.

At step 412, phrase processing application 130 initiates playback of the stored audio clip 364. In some embodiments, voice agent controller 138 provides at least a portion of audio clip 364 to voice agent 124 to produce via output device 176. For example, voice agent 124 could generate an audio output signal that includes audio clip 364. The audio output signal drives one or more loudspeakers included in output device 176 to emit soundwaves to reproduce audio clip 364.

Returning to step 410, upon voice agent controller 138 determining that database 126 has no stored audio clip corresponding to supplemental phrase portion 342, voice agent controller 138 proceeds to step 414, where phrase processing application 130 causes supplemental phrase portion 342 to be synthesized as an audio signal. For example, voice agent controller 138 could generate commands for voice agent 124 perform text-to-speech techniques to provide an audio signal corresponding to a text string included in supplemental phrase portion 342. In some embodiments, voice agent controller 138 may synthesize supplemental phrase portion 342 using a synthesized voice that sounds similar to the voice of user 160. In other embodiments, voice agent 124 may synthesize supplemental phrase portion 342 using a generic text-to-speech voice.

At step 416, phrase processing application 130 initiates playback of the synthesized audio signal. In various embodiments, voice agent 124 could provide the synthesized audio signal to output device 176. One or more speakers included in output device 176 may then emit soundwaves based on the synthesized audio signal.

In sum, a phrase processing application receives an input speech signal corresponding to a portion of a phrase spoken by a user. A voice recognition module included in the phrase processing application identifies an initial phrase portion included in the input speech signal. A trigger processing module included in the phrase processing application analyzes the speech signal and other sensor data to determine whether the user has performed an action or is in a condition to trigger the phrase processing application to complete a phrase, corresponding to the initial phrase portion, on behalf of the user.

Upon determining that a triggering event has occurred, a phrase building module within the phrase building application generates a supplemental phrase portion that complements the initial phrase portion to form a complete phrase. In some embodiments, the phrase building module refers to an internal phrase completion table that includes user-specific entries of common phrases spoken by the user. In some embodiments, the phrase building module refers to external data stores to identify phrases applicable to the initial phrase portion. The phrase building application generates the supplemental phrase portion based on the information received from the applicable data source. A voice agent controller included in the phrase processing application causes a voice agent to provide the supplemental phrase portion and drive an output device to emit soundwaves corresponding to the supplemental phrase portion.

At least one technological advantage of the disclosed approach relative to the prior art is that by processing the dialogue of a user and completing phrases on behalf of a user in real time, the phrase processing system can complete individual phrases for a user, thus relieving physical and mental strains placed on a user when speaking repeated phrases. In particular, by providing personalized phrase portions that supplement phrases spoken by a user, the phrase processing system frees the user from using her voice constantly and relieves a mental load associated with speaking accurately. Further, by storing personalized phrases that a user repeats, the phrase processing system can offer a broader range of phrases to assist the user, while also enabling the system to easily adapt to individual conversations.

1. In various embodiments, a computer-implemented method comprising detecting an initial phrase portion included in a first auditory signal generated by a user, identifying, based on the initial phrase portion, a supplemental phrase portion that complements the initial phrase portion to form a complete phrase, and providing a command signal that drives an output device to generate an audio output corresponding to the supplemental phrase portion.

2. The computer-implemented method of clause 1, further comprising determining whether a triggering event occurred that is associated with the user generating the initial phrase portion, wherein the supplemental phrase portion is identified upon determining that the triggering event occurred.

3. The computer-implemented method of clause 1 or 2, where the initial phrase portion is detected prior to determining that the triggering event occurred.

4. The computer-implemented method of any of clauses 1-3, where the triggering event comprises at least one of a key phrase included in the first auditory signal, or a manual input provided via an input device.

5. The computer-implemented method of any of clauses 1-4, where determining whether the triggering event occurred comprises detecting, in the first auditory signal, at least one of a pause in speech that is detected in the first auditory signal, or an aberration in speech that is detected in the first auditory signal.

6. The computer-implemented method of any of clauses 1-5, further comprising prior to receiving the first auditory signal, recording a second auditory signal that includes the complete phrase, and storing (i) a first audio clip that corresponds to the initial phrase portion, and (ii) a second audio clip that corresponds to the supplemental phrase portion.

7. The computer-implemented method of any of clauses 1-6, further comprising receiving a user input associated with the second auditory signal, wherein receiving the user input triggers storage of the first audio clip and the second audio clip.

8. The computer-implemented method of any of clauses 1-7, further comprising retrieving the second audio clip that corresponds to the supplemental phrase portion, where the output device generates the audio output of the first audio clip.

9. The computer-implemented method of any of clauses 1-8, further comprising in response to detecting the initial phrase portion, sending a query to an external data store, where the query is based on the initial phrase portion, and receiving, from the external data store, a first data set, wherein the supplemental phrase portion is associated with at least a portion of the first data set.

10. The computer-implemented method of any of clauses 1-9, further comprising prior to receiving the first auditory signal, receiving an input that includes the complete phrase, parsing the complete phrase into the initial phrase portion and the supplemental phrase portion, and storing, in a phrase completion table, a mapping between the initial phrase portion and the supplemental phrase portion.

11. In various embodiment, a system that completes a complete phrase that is partially spoken by a user, the system comprising at least one microphone that acquires a first auditory signal of a user, and a computing device that detects an initial phrase portion included in the first auditory signal, identifies, based on the initial phrase portion, a supplemental phrase portion that complements the initial phrase portion to form the complete phrase, and provides a command signal that drives an output device to generate an audio output corresponding to the supplemental phrase portion.

12. The system of clause 11, where the computing device further determines whether a triggering event occurred that is associated with the user generating the initial phrase portion, wherein the supplemental phrase portion is identified upon determining that the triggering event occurred.

13. The system of clause 11 or 12, where determining whether the triggering event occurred comprises detecting at least one of a key phrase included in the first auditory signal, a pause in speech in the first auditory signal, an aberration in the first auditory signal, or a manual input provided via an input device.

14. The system of any of clauses 11-13, further comprising at least one or a visual sensor or a facial electromyography sensor that acquires biometric data associated with the user, where the triggering event comprises a biometric value above a threshold value, and the biometric value is included in biometric data that includes at least one of eye gaze direction, muscle contraction, or facial movement.

15. The system of any of clauses 11-14, further comprising a voice agent that synthesizes an audio output signal of a voice speaking the supplemental phrase portion, wherein the computing device provides the command signal to the voice agent to synthesize the audio output signal, and the voice agent drives the output device to generate an audio output of the audio output signal.

16. The system any of clauses 11-15, where the output device comprises at least one speaker that generates a steerable beam that provides the audio output to a target listener.

17. The system any of clauses 11-16, where the computing device includes a memory that stores a phrase completion table, and the phrase completion table includes at least a mapping between the initial phrase portion and the supplemental phrase portion.

18. In various embodiments, one or more non-transitory computer-readable media storing instructions that, when executed by one or more processors, cause the one or more processors to perform the steps of detecting an initial phrase portion included in a first auditory signal generated by a user, identifying, based on the initial phrase portion, a supplemental phrase portion that complements the initial phrase portion to form the complete phrase, and providing a command signal that drives an output device to generate an audio output corresponding to the supplemental phrase portion.

19. The one or more non-transitory computer-readable media of clause 18, further comprising instructions that, when executed by the one or more processors, cause the one or more processors to perform the step of determining whether a triggering event occurred that is associated with the user generating the initial phrase portion, wherein the supplemental phrase portion is identified upon determining that the triggering event occurred.

20. The one or more non-transitory computer-readable media of clause 18 or 19, further comprising instructions that, when executed by the one or more processors, cause the one or more processors to perform the steps of prior to receiving the first auditory signal, receiving an input that includes the complete phrase, parsing the complete phrase into the initial phrase portion and the supplemental phrase portion, and storing, in a phrase completion table, a mapping between the initial phrase portion and the supplemental phrase portion.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
    utilizing an imaging device to capture image data of a user, or an input device to receive a physical input of the user, or a biometric sensor to obtain a biometric value of the user, wherein the image data includes a physical gesture of the user detected by the imaging device, and wherein the physical input includes a triggering input detected by the input device;
    utilizing an audio capturing device to acquire a first auditory signal of the user and a processor to detect an initial phrase portion in the first auditory signal; and
    using the processor to detect a request from the user to complete a phrase, wherein of the request includes (i) the physical gesture of the user, (ii) the triggering input of the user, or (iii) comparing the biometric value of the user to a threshold, wherein, in response to the request from the user to complete the phrase, the processor is configured to:
        retrieve from a database a complete phrase that includes the initial phrase portion;
        retrieve a supplemental phrase portion from the complete phrase that complements the initial phrase portion, the initial phrase portion and the supplemental phrase portion forming the complete phrase; and
        utilize an audio output device to output an audio reproduction of the supplemental phrase portion.

2. The computer-implemented method of claim 1, wherein the initial phrase portion is detected prior to detecting the request from the user to complete the phrase.

3. The computer-implemented method of claim 1, further comprising:
    prior to receiving the first auditory signal, recording a second auditory signal that includes the complete phrase; and
    storing, in the database:
        a first audio clip that corresponds to the initial phrase portion, and
        a second audio clip that corresponds to the supplemental phrase portion.

4. The computer-implemented method of claim 3, further comprising receiving a user input associated with the second auditory signal, wherein receiving the user input triggers storage of the first audio clip and the second audio clip.

5. The computer-implemented method of claim 3, further comprising:
    retrieving the second audio clip,
    wherein the audio output device generates the audio reproduction of the second audio clip.

6. The computer-implemented method of claim 1, further comprising:
    prior to receiving the first auditory signal, receiving an input that includes the complete phrase;
    parsing the complete phrase into the initial phrase portion and the supplemental phrase portion; and
    storing, in a phrase completion table, an entry for the complete phrase including a mapping between the initial phrase portion and the supplemental phrase portion.

7. A system that completes a complete phrase that is partially spoken by a user, the system comprising:
    at least one microphone that acquires an auditory signal generated by the user;
    an imaging device configured to capture image data of the user, wherein the image data includes a physical gesture of the user;
    an input device configured to receive a physical input of the user, wherein the physical input includes a triggering input;
    a biometric sensor configured to receive a biometric value of the user;
    an audio output device configured to output audio;
    a memory storing instructions; and
    one or more processors, that when executing the instructions, is configured to:
        utilize the imaging device to capture the image data, or utilize the input device to receive the physical input, or utilize the biometric sensor to obtain the biometric value;
        utilize the at least one microphone to acquire the auditory signal;
        detect an initial phrase portion in the auditory signal;
        detect a request from the user to complete a phrase, wherein the request includes (i) the physical gesture of the user, (ii) the triggering input of the user, or (iii) comparing the biometric value of the user to a threshold; and in response to the request from the user to complete the phrase:
retrieve, from a database, a complete phrase that includes the initial phrase portion;
retrieve a supplemental phrase portion from the complete phrase that complements the initial phrase portion, the initial phrase portion and the supplemental phrase portion forming the complete phrase; and
utilize the audio output device to output an audio reproduction of the supplemental phrase portion.

8. The system of claim 7, further comprising at least one of a visual sensor or a facial electromyography sensor that acquires biometric data associated with the user, wherein the biometric value is included in biometric data that includes at least one of eye gaze direction, muscle contraction, or facial movement.

9. The system of claim 7, wherein:
the audio output device comprises a voice agent that synthesizes an audio output signal of a voice speaking the supplemental phrase portion, and
to utilize the audio output device to output the audio reproduction of the supplemental phrase portion, the one or more processors transmit a command signal to the voice agent to synthesize the audio output signal, the voice agent driving an output device to generate the audio reproduction.

10. The system of claim 7, wherein the audio output device includes at least one speaker that generates a steerable beam that provides the audio reproduction to a target listener.

11. The system of claim 7, wherein:
the memory further stores a phrase completion table; and
the phrase completion table includes at least an entry for the complete phrase including a mapping between the initial phrase portion and the supplemental phrase portion.

12. One or more non-transitory computer-readable media storing instructions that, when executed by one or more processors, cause the one or more processors to perform the steps of:
utilizing an imaging device to capture image data of a user, or an input device to receive a physical input of the user, or a biometric sensor to obtain a biometric value of the user, wherein the image data includes a physical gesture of the user detected by the imaging device, and wherein the physical input includes a triggering input detected by the input device;
utilizing an audio capturing device to acquire an auditory signal of the user and the processor to detect an initial phrase portion in the auditory signal;
detecting a request from the user to complete a phrase, wherein of the request includes (i) the physical gesture of the user, (ii) the triggering input of the user, or (iii) comparing the biometric value of the user to a threshold; and
in response to the request from the user to complete the phrase:
retrieving from a database, a complete phrase that includes the initial phrase portion;
retrieving a supplemental phrase portion from the complete phrase that complements the initial phrase portion, the initial phrase portion and the supplemental phrase portion forming the complete phrase; and
utilizing an audio output device to output an audio reproduction of the supplemental phrase portion.

13. The one or more non-transitory computer-readable media of claim 12, further comprising instructions that, when executed by the one or more processors, cause the one or more processors to perform the steps of:
prior to receiving the auditory signal, receiving an input that includes the complete phrase;
parsing the complete phrase into the initial phrase portion and the supplemental phrase portion; and
storing, in a phrase completion table, an entry for the complete phrase including a mapping between the initial phrase portion and the supplemental phrase portion.

* * * * *

UNITED STATES PATENT AND TRADEMARK OFFICE
CERTIFICATE OF CORRECTION

PATENT NO. : 11,657,814 B2
APPLICATION NO. : 17/066433
DATED : May 23, 2023
INVENTOR(S) : Stefan Marti et al.

Page 1 of 1

It is certified that error appears in the above-identified patent and that said Letters Patent is hereby corrected as shown below:

In the Claims

Column 19, Claim 1, Line 62, please delete "of" after wherein;

Column 22, Claim 12, Line 15, please delete "of" after wherein.

Signed and Sealed this
Fourth Day of July, 2023

Katherine Kelly Vidal
*Director of the United States Patent and Trademark Office*